Aug. 3, 1965 P. R. KARR 3,199,106
TIME DISTORTION TOLERANT SIGNALLING SYSTEM
Filed April 2, 1962 3 Sheets-Sheet 1
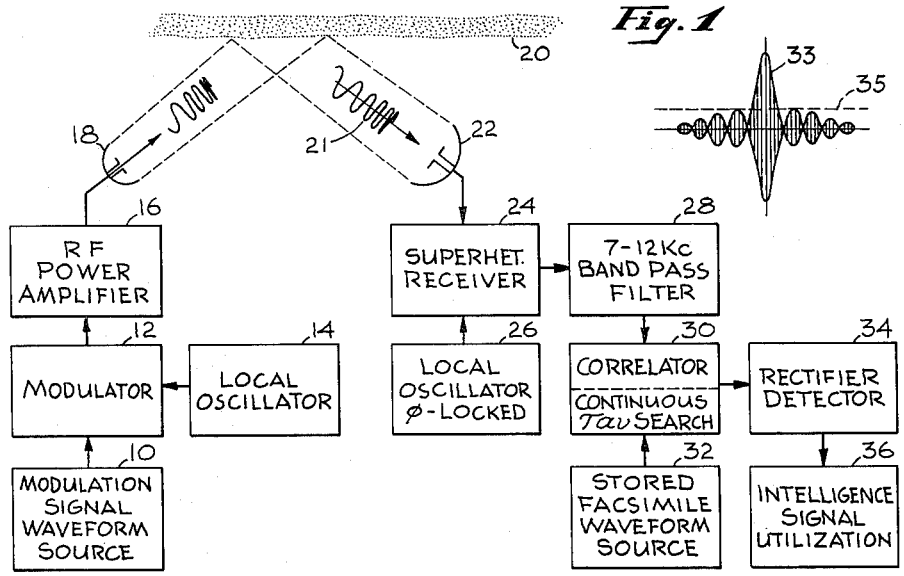
Fig. 1
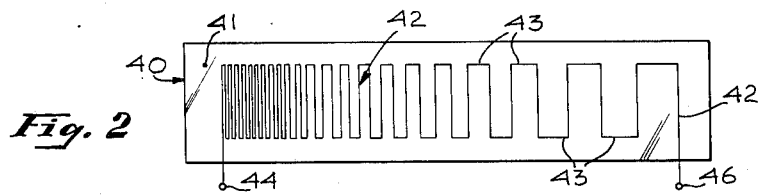
Fig. 2
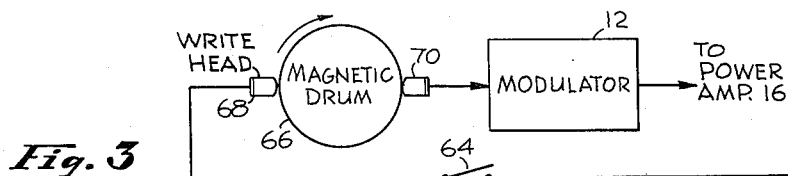
Fig. 3
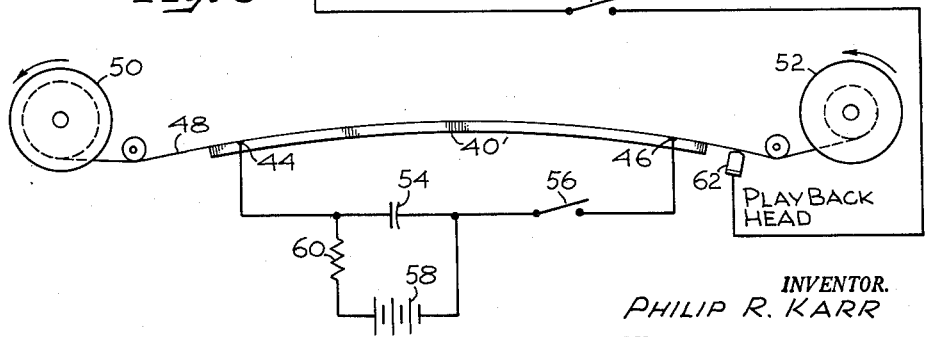
INVENTOR.
PHILIP R. KARR
BY
*Benjamin DeWitt*
ATTORNEY

PHILIP R. KARR
INVENTOR.

BY
ATTORNEY

United States Patent Office 3,199,106
Patented Aug. 3, 1965

3,199,106
TIME DISTORTION TOLERANT SIGNALLING SYSTEM
Philip R. Karr, Torrance, Calif., assignor, by mesne assignments, to Thompson Ramo Wooldridge Inc., Cleveland, Ohio, a corporation of Ohio
Filed Apr. 2, 1962, Ser. No. 184,603
5 Claims. (Cl. 343—17.2)

The present invention relates to improvements in signalling systems, and more particularly to improvements in signalling systems in which correlation techniques or pulse compression techniques are employed to improve the effective sensitivity, selectivity, range, and reliability of the system. More specifically, the present invention is concerned with methods of and apparatus for signalling in which a transmitter propagates a relatively long duration frequency modulated pulse signal and a receiver processes that pulse signal in a manner to effectively time-compress the received signal to a much shorter time duration and higher peak power.

Applicant is aware of one previously used signalling system in which a transmitter propagates an oscillatory wave through a wave medium, with the propogation being in the form of time-spaced pulses, and in which each pulse comprises a substantial number of cycles of the oscillatory waveform. In that previous system, during each pulse, the frequency of the carrier wave is modulated in a manner such that upon reception the pulses may be applied to a correlation apparatus and compared with a similarly modulated reference signal or reference waveform for enhanced detection of signals from the particular transmitter to the exclusion of noise and other extraneous signals or jamming signals. More particularly, that previous system utilizes a logarithmic time function signal, that is, a signal pulse or relatively short duration burst of oscillatory wave energy specifically characterized in that during the pulse period the fundamental frequency of the wave varies exponentially in accordance with a particular function of time, either decreasing or increasing. Such a signal has one highly desirable attribute: any selected portion of it, when time-compressed, or expanded, as, for example, by Doppler shift, is substantially identical to a different time sequential portion of the undistorted waveform. Accordingly, the so distorted signal is substantially identical to and comparable with a facsimile of the transmitted waveform.

Such a signal, while useful in substantially any signalling or communication system, is especially valuable in echo ranging systems for detection of moving targets in that it provides a method of increasing the average power available for detection of moving targets without any loss at the receiver of the range resolution usually dictated by tactical considerations. Increased power without resolution deterioration is accomplished by transmitting a long duration pulse in which the carrier frequency is exponentially modulated and then, by proper signal processing methods at the receiver, causing an effective time compression of the received echoes to form a pulse of much shorter duration and an importantly increased peak power.

More specifically, in systems using such a signal, the received echo of the specified signal, even though time-distorted by an unknown or unpredictable amount of Doppler shift, is readily correlatable and therefore, in effect, separable from the accompanying noise. In short, a signal waveform having the above-specified logarithmic characteristic has the property of avoiding the usual deleterious effects of Doppler shift and therefore enables maximum detection sensitivity in the receiver for essentially any and all target or object velocities. For clarity of description, such unique signal waveforms are herein discussed with reference to their use in echo ranging systems; however, it should be understood that they are not limited to such systems but may be advantageously used wherever advantages are to be gained by generating and transmitting an oscillatory pulse and, upon reception, processing it in a manner to provide increased pulse amplitude and signal-to-noise ratio. In echo ranging systems, change in the pulse length or pulse time duration may be of primary interest. In communication systems, for example in communication between a fixed station and a high velocity aircraft or space vehicle, change in signal amplitude with consequent improvement in sensitivity and noise rejection may be most important.

The ability of systems using the above-specified logarithmic signal waveform to respond equally to targets of all velocities is sometimes quite advantageous. However, in many signalling systems it is desired that the receiver sensitivity should be to some degree dependent upon the amount of time distortion occurring between the transmitter and receiver. For example, in echo ranging systems, in order to reject ground "clutter," it is often desired that the receiver respond only to targets or objects having a specified velocity or having a velocity within a predetermined range of velocities. In other applications it may be desired that the system respond differently to objects having specified velocity differences so as to provide information as to the velocity of various detected objects. For example, in a specific echo ranging system it is often desired that the receiver should be "blind" to all targets except those having velocities in excess of a preselected figure. The above-specified logarithmic signal waveforms, being "immune" to Doppler shift insofar as detection sensitivity is concerned, do not satisfy the stated desideratum.

The present invention provides an apparatus and a method whereby relatively low amplitude, long duration pulses may be transmitted, thereby obtaining high energy in each pulse, and whereby the long duration pulses can be so processed at the receiver as to produce short duration, high amplitude pulses only if the pulses prior to reception are subjected to a time distortion within a preselected range of time distortions.

Accordingly, it is a primary object of the present invention to provide a method and apparatus in a signalling system which characteristically enables correlation detection only when the signal before reception is time-distorted to a degree within a predetermined range of time distortions.

It is a further object of the present invention to provide apparatus in an echo ranging system which enables a high degree of received signal correlation and a high signal-to-noise ratio in response to echoes from objects having velocities within a preselected range of velocities and a much lower degree of correlation for objects having velocities outside said range.

It is an additional object to provide an improved method and apparatus utilizing post-reception integration of time-distorted electrical signals for increasing the signalling range capability of signalling systems without degrading the noise rejection capability and at the same time discriminating against signals which are subjected to time distortions outside a preselected range of time distortions.

Briefly, in one embodiment of the present invention adapted for echo ranging applications, long duration pulses of oscillatory energy are transmitted by a generally conventional transmitter apparatus. The oscillatory pulses and the means for generating them depart from the conventional in that the instantaneous phase of the frequency modulated oscillation varies substantially logarithmically with time as compared with the instantaneous phase of a constant frequency reference wave. However, the instantaneous phase is not precisely logarithmic with time, but rather varies as a function which includes a logarithmic component and a linear component. That characteristic of the wave, when it is used as a transmitted wave, enables detection of targets having velocities within a specified range of velocities to the substantial exclusion of targets having velocities outside that range. Further, such targets can be detected in the presence of high noise levels by the use of correlation techniques in the apparatus for receiving the signals, and good range resolution can be maintained without the use of extreme peak energies in the transmitter. To that end, received echo pulses are processed by a correlation means which compares the same with a facsimile or replica of the transmitted signal waveform, and output signals are produced from the correlation means only when the velocity of the object which is returning the echo pulses is within a preselected range of velocities. Generally, in accordance with the present invention, the reference signal utilized in the receiver for comparison purposes may be a time delayed sample of the waveform which modulates the transmitter, or a synthetically generated facsimile or replica of the waveform applied to the transmitter, or it may be, in the case of echo ranging apparatus, a permanently recorded waveform which is used both for generating a transmitter modulation signal and for generating an identical signal for correlation use in the receiver.

The foregoing and other objects and advantages of the present invention will be more fully understood from the following description when considered together with the accompanying drawings, wherein like reference characters indicate like parts, and in which:

FIGURE 1 is a block diagram illustration of the general form of signalling system in which the present invention finds application;

FIG. 2 is an illustration of a printed circuit waveform used in a portion of the apparatus of FIG. 1;

FIG. 3 is a detailed circuit diagram illustrating one form which the transmitter apparatus portion of FIG. 1 may take;

Figure 4:
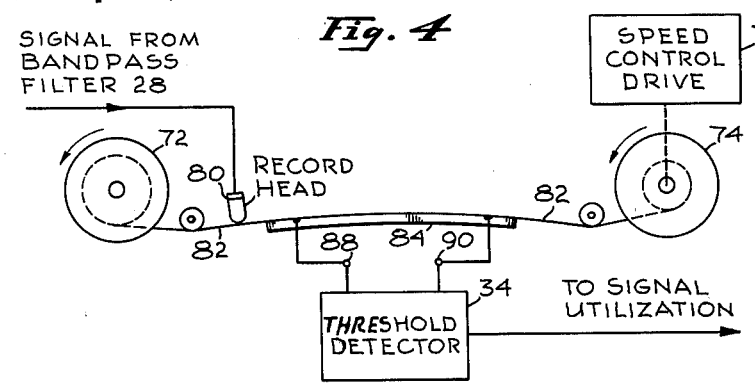
FIG. 4 is a circuit diagram illustrating an arrangement which may be used in one embodiment of the receiver apparatus illustrated by FIG. 1.

In FIG. 1 there is shown a signalling system including a transmitter apparatus which may conventionally comprise an oscillator 14 connected to apply oscillatory electrical signals to a modulator 12, which in turn applies modulated electrical signals through a power amplifier 16 to a transmitting antenna 18. In addition, modulating signals are applied to a second input of the modulator 12 from a source of modulation signal 10, which source will be described in more detail hereinafter. By way of example, the oscillator 14 is indicated as producing a sinusoidal wave having a frequency of 90 kc. per second. That wave, when modulated is transformed to a frequency modulated signal which varies in frequency from 97 kc. to 102 kc. In accordance with conventional practice, the modulation may be accomplished by conventional heterodyning technique in which a modulation signal ranging from 7 kc. to 12 kc., for example, is mixed with the 90 kc. signal from oscillator 14. The upper sideband is selected by an appropriate high-pass filter within the modulator 12 and applied to the amplifier 16 for electromagnetic propagation by way of antenna 18.

In accordance with conventional practice, the pulses of oscillatory energy radiated by antenna 18 impinge upon and are reflected by any object which they illuminate, such as, for example, the ionized atmospheric layer 20 depicted in FIG. 1. The pulses reflected or scattered by the layer 20 are received by the receiving antenna 22 and, in the event that the layer 20 or other reflecting object is moving relative to the antennas 18 and 22, may be time distorted or Doppler shifted. Upon reception, each frequency modulated pulse is applied from antenna 22 to a superheterodyne receiver 24 which conventionally may comprise a heterodyne demodulator or mixer. The signals applied to receiver 24 are, of course, frequency modulated from approximately 97 kc. to 102 kc., although they may be slightly shifted in frequency as a result of Doppler effect time distortion. In FIG. 1, a single pulse impinging upon the receiving antenna 22 is depicted at 21 and is diagrammatically shown as having a higher frequency, for example 102 kc., during the initial portion of the elongated pulse, with the frequency modulation changing or decreasing to 97 kc. near the end of the oscillatory pulse. That signal pulse ranging from 102 kc. to 97 kc., when applied to receiver 24, is mixed or heterodyned with a 90 kc. signal from a local oscillator 26 which is connected to apply signals to a second input of the receiver 24. The local oscillator 26, in accordance with the present invention, should be critically phase-locked to run in exact phase synchronism with the local oscillator 14 of the transmitter. Such phase locking may be accomplished by any one of various techniques known to those skilled in the art. Upon heterodyne demodulation in the receiver 24, the received signal pulse is transformed to a signal pulse having the same frequency modulating characteristic and same duration, but ranging in frequency from 7 to 12 kc. That transformed representation of the received signal pulse is applied from the output of receiver 24 through a bandpass filter 28 to a first input of a correlator mechanism 30.

The correlator 30 compares the received signal pulse with a reference signal provided at a second input of the correlator 30 from a stored facsimile waveform source 32. Correlator 30 operates, in a manner to be more fully described hereinafter, to multiply each and every sequential incremental portion of the received pulse with a corresponding portion of the reference waveform from source 32 and to sum the incremental products so formed. The result of that incremental multiplication and summation is production at the output of the correlator 30 of a signal having the general form indicated at 33. It will be understood that the waveform 33 indicates the envelope of an oscillatory pulse which includes frequency components ranging from 7 to 12 kc. The signal pulse indicated at 33 is applied to a rectifier type detector 34. Preferably, the detector 34 is biased to provide a threshold function so that the detector responds only to signals exceeding an amplitude as indicated by the dotted line 35 on the waveform 33. Accordingly, at the output of the detector 34 there appears a short duration pulse from which low amplitude noise has been eliminated, and which pulse has an enhanced amplitude and a shortened time duration as compared to the received oscillatory pulse 21.

Since the operation of correlator 30 depends on comparison of the received signal with a facsimile of the modulation waveform produced by source 10 in the transmitter, it is readily apparent that correlator 30 operates to reject spurious signals such as jamming signals and the like. Thus, it is seen that the system illustrated in FIG. 1, by use of the specific waveform produced by the sources 10 and 32, enables increased receiver sensitivity, improved selectivity, and a high degree of rejection of spurious signals and noise. The signal output from detector 34 may, of course, be applied to any purpose, as represented diagrammatically by the intelligence signal utilization means 36. In accordance with the present invention, it is contemplated that the utilization means 36 may comprise any known apparatus for utilizing information from a pulse type communication system. Examples of such systems are pulse code modulation (PCM) systems and pulse position modulation (PPM) systems. The structure and operation of such communication systems are well known in the art and need not be further delineated here.

Because of the unique character of the modulation signal preferably utilized in accordance with the present invention, it is desirable to consider one example of an arrangement by means of which the modulation signal may be generated and produced at the output of source 10. FIG. 2 illustrates a printed circuit member 40 which is preferably included as a component part of the modulation signal source 10 of FIG. 1. Member 40 comprises a base plate or support member 41, which may be formed of any one of various insulating materials generally used in the printed circuit art, but which preferably is a reasonably flexible strip or sheet of high dielectric plastic such as epoxy resin impregnated fiberglass or the like. On the sheet or strip 41 there is formed, by conventional printed circuit techniques, a sinuous metallic conductor which comprises a large plurality of parallel spaced conductor portions 42 extending transversely of the long dimension of the strip. The transverse conductor portions 42 are alternately connected at their ends by interconnection conductive portions 43 to form a series-connected set of transverse conductors, with the final transverse conductor 42 at the right end being connected to a terminal 46 and with the final transverse conductor at the left end being conductively connected to a terminal 44. It will be appreciated that the conductors 42 and 43 form a serial conductive path extending sinuously back and forth across the printed circuit support between the terminals 44 and 46.

In accordance with the present invention, the spacing between each successive pair of conductors 42 decreases as they progress along the length of the strip 40 from right to left. More specifically, the spacings do not, as might be first assumed, decrease linearly, but rather the spacing between conductors decreases approximately but not exactly in accordance with a logarithmic function as the distance along the support 41 increases from right to left. The printed circuit waveform as shown in FIG. 2 is utilized in the waveform source 10, as shown in detail in FIG. 3.

In accordance with the exemplary arrangement illustrated in FIG. 3, the printed circuit strip 40 is bent or bowed slightly, as indicated at 40', and is held in that position by appropriate supports (not shown). A conventional magnetic tape 48 is positioned contiguously adjacent that surface of the printed circuit board which carries the sinuous conductive waveform by means of a tape system including a driven take-up reel 52 and a storage reel 50. Initially, in order to produce a magnetically stored signal of the proper character on the magnetic tape 48, the tape is placed with the magnetizable surface closely against the surface of the printed circuit board 40 which carries the sinuous conductive pattern. The tape drive mechanism is then stopped so that a portion of the tape 48 is fixed in position relative to the printed circuit 40. The terminals 44 and 46 of the sinuous printed circuit are externally connected through a capacitor 54 and a switch 56; a direct current source 58 and a current limiting resistor 60 are connected across the capacitor 54. When the switch 56 is in the open position as shown, the direct current source 58 charges capacitor 54 to a maximum. Upon closure of the switch 56, an intense pulse of direct current is passed serially through each and every one of the conductors 42 of the printed circuit waveform. That current pulse operates to magnetically orient the particles of magnetic material on the surface of the tape 48 and forms a waveform on the tape which is identical in essential respects to the pattern of the conductors 42 of the printed circuit of FIG. 2.

After the charge of capacitor 54 is dissipated through the printed circuit, the switch 56 is again opened, and the drive means (not shown) for actuating the take-up reel 52 is started to drive the waveform which has been printed on the magnetic tape 48 past a playback head 62. Coincidently with starting the drive reel 52, a switch 64 connected between playback head 62 and a recording head 68 is closed. Accordingly, as the waveform which has been printed on the magnetic tape 48 traverses the playback head 62, an alternating current signal is produced thereby and is communicated to the recording head 68 and recorded in conventional fashion on a magnetic drum 66. The magnetic drum recording system comprising drum 66, the recording head 68, and a playback head 70, may be conventional in all respects and accordingly is shown only in a diagrammatic form. In accordance with the present invention, it is important, however, that the magnetic drum 66 should at all times rotate at a precise speed. To that end, any one of various conventional speed-controlled drive means may be provided for driving the drum 66, and, if so desired, position indicative markers may be recorded around the periphery of the drum, and a playback head (not shown) may be provided for responding to such markers and for servo-controlling the drum drive system.

After the electrical signal waveform corresponding to the printed circuit pattern 42 is recorded on the magnetic drum 66, the printed circuit member 40 and the tape drive system comprising reels 50 and 52 and their appurtenances need no longer be used. That is, switch 64 is again opened, and the tape drive mechanism is completely deenergized. A waveform of the desired character has been recorded on the magnetic drum 66 and may be played back therefrom at will. Accordingly, no further use of the mechanism for applying such a waveform to the drum 66 is required. Of course, it will be understood that, whenever desired, the waveform on drum 66 may be erased by conventional techniques and a signal such as that represented by the printed circuit 40 may be reapplied to the drum. Moreover, if desired, a plurality of printed circuits generally similar to the member 40, but having slightly different mathematical functions defined by the spacings of the transverse conductors 42, may be provided. By selection of a printed circuit defining the mathematical function which is desired at any particular time, that particular waveform or function may be converted to an electrical signal by means of the apparatus of FIG. 3 and more or less permanently recorded on the drum 66. Thus, the mathematical function defined by the waveform recorded on the drum 66 may be changed from time to time depending on the particular type of modulation signal which is desired to be produced by the source 10 at any given time. As indicated in FIG. 3, the playback head 70 responds to the waveform recorded on the magnetic drum 66 and applies a modulation signal to the input of the modulator 12 in the apparatus of FIG. 1.

In accordance with the present invention, the waveform carried on drum 66 and applied therefrom to the modulator 12 in FIG. 1 preferably takes the form $$f(t) = \cos[k \ln(t+s) - at] \text{ for } 0 < t < T \quad (1)$$

wherein $k$ in a constant;

$t$ represents time from the beginning of the pulse waveform;

$s$ represents a time constant;

$a$ is a finite constant determinative of the rate at which the time variation of phase departs from a pure logarithmic function; and $T$ defines the time duration of the modulation waveform.

The manner in which that specific preferred waveform, as defined by the above equation, accomplishes the purposes of the present invention will be discussed more fully hereinafter.

In the previous consideration of FIG. 1, the components 30 and 32 of the receiver were passed over without detailed consideration of their structure and operation. In view of the unusual and critical characteristics of the modulation signal provided by source 10 and transmitted by way of antenna 18, the preferred methods of and apparatus for reception and correlation processing of the signal deserves further attention. In FIG. 4 there is shown, by way of example, one preferred arrangement which may be used for accomplishing the functions heretofore ascribed to elements 30 and 32 of FIG. 1. As shown in FIG. 4, the correlation mechanism comprises a magnetic tape transport arrangement including a take-up reel 74 and a storage reel 72 and a speed-controlled drive means 76 coupled to actuate the take-up reel 74. In accordance with the present invention, the signal from the bandpass filter 28 of FIG. 1 is applied by way of conductor 78 to a recording head 80 positioned in operative adjacency to the magnetic tape 82. A received and demodulated signal pulse conforming to the function defined by Equation 1 above is thus recorded on the tape 82, with the independent variable time being transformed to a distance or position variable on the tape. The tape is moved continuously over a printed circuit board 84 which may and preferably does take the same form as the printed circuit 40 shown in FIG. 2. That is, the printed circuit 84 is preferably identical to the printed circuit 40 which is contained within the modulation source 10 of the transmitter apparatus.

Providing that the tape 82 is driven at the appropriate speed, the recording head 80, responding to the received signal pulse, creates a flux pattern on the tape identical to the flux pattern which was carried on the magnetic drum 66 and applied therefrom to the modulator 12. As the tape 82 moves continuously across the printed circuit 84, a tape position will ultimately be reached at which the flux pattern on the tape exactly matches or coincides with the conductor pattern on the printed circuit board. At this instant, the motion of the tape relative to the printed circuit has the effect of causing each and every one of the conductors 42 to simultaneously cut through a maximum intensity flux field provided by the tape. Accordingly, a minute electromotive force is generated in each one of the transverse conductors 42, and, since the conductors 42 are all connected in series, the individual electromotive forces add to provide a very substantial voltage output at the terminals 88 and 90. The output voltage is, of course, an alternating current voltage containing frequency components ranging from approximately 7 kc. to approximately 12 kc. and having an envelope, as indicated at 33 in FIG. 1. That correlated output is applied to and utilized by the threshhold detector 34, as discussed heretofore in connection with FIG. 1. It is to be understood, of course, that the receiver 24 responds not only to the unique signal from the transmitter, but also will receive various extraneous signals and will receive and/or generate a certain amount of noise. Some of that noise is eliminated by the bandpass filter 28; however, a very substantial amount of it passes through the filter 28 and is applied to the recording head 80 and recorded on the magnetic tape 82. An important feature of the apparatus of the present invention is that such extraneous signals and noise recorded on tape 82 will not create any substantial excitation of the printed circuit waveform 84. That is, as a particular noise pulse recorded on the tape 82 moves across the printed circuit 84 from one end to the other, the flux on the tape representing that noise pulse will sequentially cut each and every one of the printed circuit conductors 42, and minute electromotive forces will be generated by that noise pulse. However, those minute noise voltages are time-sequential and are not instantaneously additive. Accordingly, extraneous signals or noise will produce a slight noise voltage at the terminals 88 and 90, but will not produce any voltage magnitudes even remotely comparable to the sin $x/x$ characteristic waveform 33 which is generated by a unique signal corresponding exactly to the printed circuit waveform.

Figure 5:
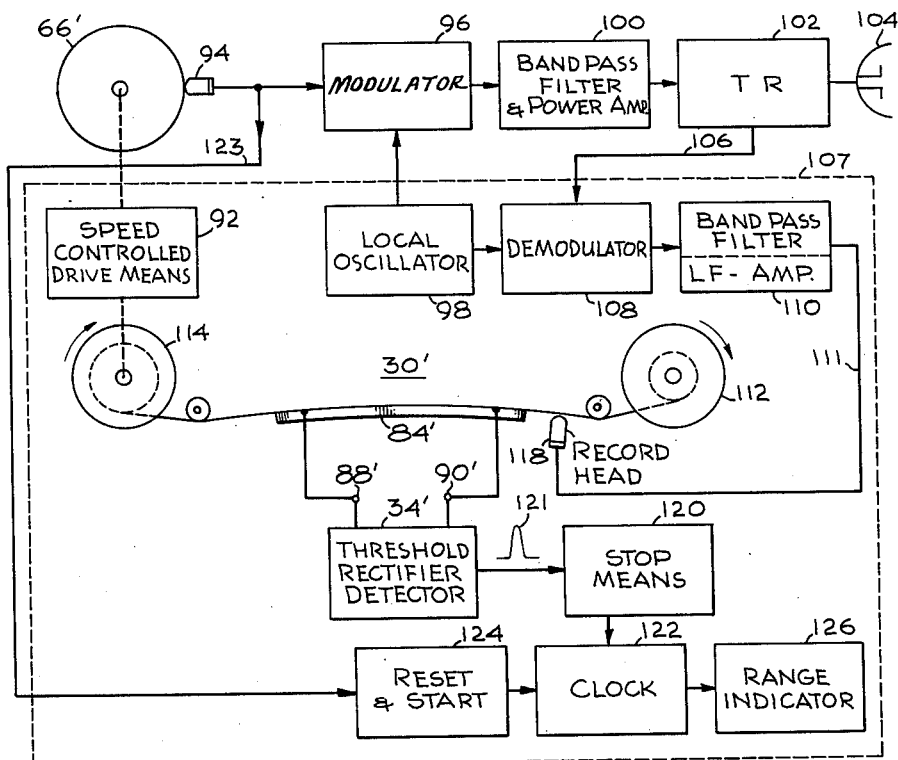
FIG. 5 is a circuit diagram, partially in block form, illustrating an echo ranging type of signalling system in which the present invention finds advantageous application.

Apparatus in accordance with the concepts of the present invention has proved particularly advantageous in pulse-echo ranging systems such as radar and sonar. FIG. 5 illustrates, by way example, one radar-type echo ranging apparatus utilizing the present invention. Specifically in FIG. 5 there is shown an echo ranging system comprising a modulation signal source which takes the form of a magnetic recording drum 66'. The drum 66' preferably has a waveform recorded thereon in accordance with the method described in the discussion of FIG. 3. Accordingly, a playback head 94 positioned adjacent the drum 66' will produce an electrical signal pulse which is frequency-modulated during the pulse period. That signal pulse is applied to a conventional modulator 96 which, by heterodyne action, applies the modulation signal waveform to the carrier signal from local oscillator 98. Thus, as the drum 66' revolves at a continuous speed, as determined by a speed-controlled drive means 92 coupled thereto, there is produced at the output of modulator 96 a train of radio frequency pulses having a carrier frequency as determined by the frequency of oscillator 98 and having pulse modulation as determined by the waveform carried on the drum 66'. The carrier frequency pulses from modulator 96 are applied through a bandpass filter and power amplifier 100 and through a transmit-receive switch 102 of conventional form to the echo ranging antenna 104. It is to be understood that, as in conventional echo ranging systems, the power amplifier 100 produces time-spaced pulses and not a continuous carrier output. To that end, any conventional means may be provided for keying the power amplifier 100 "on" only during the time that a modulation waveform is developed by playback head 94. For example, if desired, a keying marker may be provided on the magnetic drum 66' just ahead of the beginning of the modulation waveform, and that keying marker may acuate a circuit (not shown) for turning on the power amplifier 100 during the time interval when the playback head 94 is applying the desired modulation waveform to the first input of modulator 96.

When a frequency modulated pulse radiated from antenna 104, as just described, is reflected from a moving target and produces a return echo at the antenna 104, that echo is conducted in conventional fashion through the transmit-receive switch 102 and by way of output conductor 106 to a synchronous demodulator 108 which is included in the receiver portion 107 of the echo ranging system. To properly synchronously modulate the received echo signal, a carrier signal from local oscillator 98 is applied to a second input of demodulator 108. At the output of demodulator 108, signals corresponding to the sum and difference of the received echo and the local oscillator signal are produced. Bandpass filter and IF amplifier 110 operates to select the lower side band or difference signal and applies the same by way of conductor 111 to a recording head 118.

For correlation detection of the received signal, there is provided a tape transport mechanism comprising a take-up reel 114 and a storage reel 112 between which there extends a length of magnetic tape 116. The recording head 118 is positioned operatively adjacent the tape 116. A printed circuit member 84', which preferably corresponds to the member 40 shown in FIG. 2, is supported between the tape reels 112 and 114 so that as the tape moves from the reel 112 toward reel 114 it passes lengthwise along the printed circuit member, with the magnetizable surface of the tape disposed closely adjacent the surface of the printed circuit member which carries the sinuous electrically conductive pattern.

In the preferred embodiment, the tape transport take-up reel 114 is driven by the same speed-controlled drive means 92 as is the transmitter waveform source drum 66'. Accordingly, the rate at which the magnetic tape 116 progresses lengthwise along the printed circuit 84' is synchronized with the signal produced by playback head 94 in the transmitter. Therefore, and as described in more detail heretofore with reference to FIG. 4, a frequency modulated pulse, when applied to the tape 116, will have the same length along the tape as the length of the waveform on the printed circuit 84' and, assuming no intervening time distortion, will exactly match the waveform of printed circuit 84'. When a portion of the magnetic tape 116 having such a pulse recorded thereon moves into coincidence with the waveform on the printed circuit 84', the space-distributed flux maxima on the tape will simultaneously each be intercepted by a different transverse conductor 42 of the printed circuit, and an integrated alternating current signal will be produced at terminals 88' and 90'. That signal has the envelope from indicated at 33 in FIG. 1 and, as stated before, has a fundamental frequency corresponding to the fundamental frequency of the IF signal produced by demodulator 108. The output signal from terminals 88', 90' is applied to and rectified by the threshold detector 34' to produce a high amplitude, short duration, video pulse, as indicated by the numeral 121.

To enable range indication in response to the intelligence signal output from detector 34', there is provided a clock means 122 for measuring elapsed time from the initiation of a transmitted pulse to the time of reception of an echo signal at detector 34'. For initiation of the time measurement, there is provided a reset and start circuit means 124 connected to respond to the beginning of a transmission pulse produced by transmitter playback head 94. Playback head 94 is connected by a conductor 123 to the input of reset and start circuit 124. In response to the initial portion of a waveform produced by playback head 94, the reset and start circuit 124 produces an output signal which is applied to start the clock 122. After a time has elapsed dependent upon the range of the target or object in question, the receiver system produces an output pulse 121, as before described, and actuates the stop means 120, which in turn actuates the clock 122 to terminate its operation. Clock 122 thereby continuously produces an output signal representative of the time which elapsed between the transmitted pulse and the received echo. That range representative signal is applied to a range indicator 126 which may take any of various forms known to those skilled in the art. The clock means 122, of course, may comprise any one of a great variety of analog or digital time measuring devices. Likewise, the stop means 120 and the reset and start means 124 may comprise any one of various known circuit arrangements for performing the functions just described.

In the foregoing, the apparatus of FIGS. 1, 4, and 5 have been described by way of example as comprising tape transport arrangements which function as correlation means. In some alternative embodiments, instead of using the tape transport arrangement 112, 114, 116 as shown in FIG. 5, it is advantageous to use a magnetic drum to which the recording head 118 would apply the received IF echo pulse. In such an alternative arrangement, the printed circuit member 84' preferably is formed as a segment of a cylinder, that is, concavely formed with the sinuous conductive pattern on the concave surface. The printed circuit member is then positioned closely adjacent to but slightly spaced from the magnetic drum on which the received signal has been recorded so that the printed circuit conductors of the member 84' are closely coupled to the magnetic echo signal on the drum surface. It will be appreciated that such an alternative arrangement operates to produce the same results as the arrangement specifically disclosed in FIG. 5. Similar alternative arrangements using magnetic drums as the correlator mechanisms have been used in communication systems of the type illustrated by FIG. 1.

Figure 6:
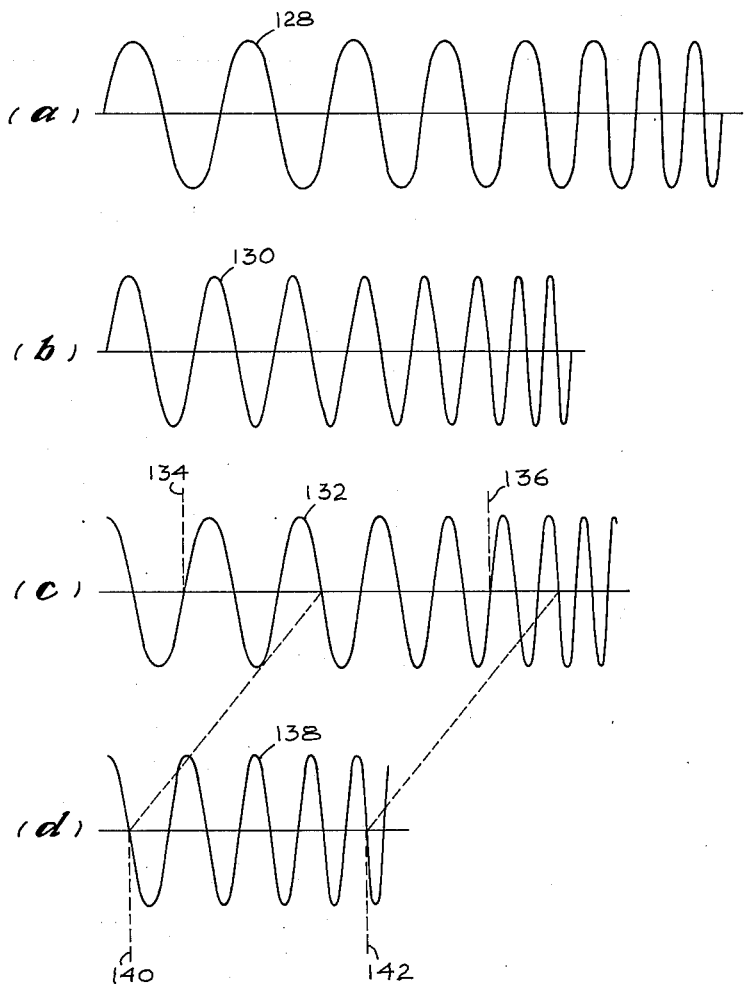
FIGS. 6(a) to 6(d) are graphical representations of waveforms useful in explaining the operation and effect of the present invention.

System as just described in connection with FIGS. 1 to 5 would operate with reasonable satisfaction if a linearly frequency-modulated waveform, as illustrated in FIG. 6(a), were used. However, if linear frequency modulation of the transmitted pulse is used in such systems, time distortion of the transmitted signal prior to reception will have the effect of so distorting the received signal that it cannot be usefully matched or correlated with the reference waveform carried by the printed circuit member 84 (FIG. 4). Such time distortion may result from a variety of causes. For example, if the signal launched by the transmitter encounters a reflective layer 20 in the atmosphere, as shown in FIG. 1, and is therefrom reflected to the receiver, a time distortion of the received signal will be caused by motion of the reflective layer 20. Likewise, if the magnetic drum 66 of FIG. 3 should for any reason have an incorrect speed, the result would be a time expansion, or compression, of the waveform applied to modulator 12 and transmitted by antenna 18. With the transmitted signal so distorted, the signal upon reception would not be efficiently correlated or detected by the correlator 30. Thus, the reception would be very substantially deteriorated, if not completely lost. In other words, if the time distortion arising from these or other causes is of sufficient magnitude, the correlator 30 in the receiver will be unable to produce an efficient or useful output because the time-distorted received signal will not be properly comparable with the reference waveform on the printed circuit 84, and therefore the communication will be lost. Linear frequency modulation is a limiting case ($a \rightarrow \infty$) of the present invention. For some purposes, it would be satisfactory. However, by effectively providing a range of $a$ (other than $a=0$ or $a=\infty$), the present invention provides a family of waveforms adjustable to cover the range of time distortions considered.

Similarly, in echo ranging devices or systems of the type shown in FIG. 5, time distortion of the return echo may prevent optimum performance of the signal correlation means 30', with a resulting loss of sensitivity and range resolution. That is, if the usual linear frequency modulation as heretofore proposed in the prior art were used, operation of the echo ranging system of FIG. 5 would be seriously degraded by the time distortion imposed on the received echo signal by relative motion of a target or object with respect to the echo ranging system. If target motion exists, a time distortion of the received echo signal will always result. If the target motion is closing in character, the resulting time distortion causes the received echo to be a time-compressed version of the signal delivered to the transmitter by the signal source 66'. Therefore, even when the reference record signal producing means 84' at the receiver provides identically the same signal waveform as the signal source 66' at the transmitter, if normal linear frequency modulation of the transmitted pulse were used, the signal correlation means 30' would be unable to find a precise relation between the echo and the reference record printed circuit 84'. Accordingly, the output integrated signal as applied from reference record 84' to detector 34' would be seriously degraded in amplitude and would be insufficiently time-compressed for the desired range resolution. Such degradation of the received signal means a consequent loss of signal sensitivity and deterioration of the system signal-to-noise ratio.

A better appreciation of the effect of Doppler shift or signal correlation by any signal correlation means may be had by reference to the waveforms shown in FIGS. 6(a) to 6(d), inclusive. First, let it be assumed that in the arrangement of FIG. 5 the magnetic drum 66' is provided with the conventional linear frequency modulation waveform of FIG. 6(a). On reflection from a closing target the transmitted wave is time distorted by the Doppler effect and compressed to the form shown in FIG. 6(b). By critical examination of FIGS. 6(a) and 6(b) it may be observed that there is no way in which these two waveforms may be superimposed or correlated so that they coincide. That is, no substantial portion of waveform 130 is identical to a portion of waveform 128. Therein lies the practical impossibility of correlation of linear frequency modulated oscillatory signals which have been subjected to an unknown degree of time distortion. Linear frequency modulation, as variously proposed in the prior art, is useful and correlatable only if no time distortion occurs in the system or in response to target Doppler shift. In this regard, it should be observed that such time distortion may be caused, not only by moving target Doppler shift, but also by variations in system performance. For example, in the apparatus of FIG. 1, if the rotational speed of magnetic drum 66 were to depart from the optimum, the result would be a time compression (or expansion) of the modulation signal applied to modulator 12. As another example, consider a communication system employing a large number of resonant dipoles in earth orbit to serve as scatterers for microwave signalling between two ground base stations. Such ground base stations are essentially the apparatus of FIG. 1, and the orbitally distributed resonant dipoles are the layer 20 of FIG. 1. In such a system, the differential Doppler effect existing between different scatterers within the antenna beams will mean that different scatter signals or "echoes" as received by the receiving antenna 22 will be differently time-distorted. Such differential Doppler effect would seriously degrade the performance of the system of FIG. 1 if a waveform such as that of FIG. 6(a) were transmitted.

In one previously used echo-ranging system of which applicant is aware, the foregoing time distortion difficulties have been avoided by the use of a transmitted signal which is completely immune to the normal de-correlating effect of time distortion. Specifically, that previously used system employed a preferred signalling waveform characterized in that the instantaneous phase relative to the phase of a fixed frequency signal varied as a precise logarithmic function of time during the transmitted pulse interval. Such logarithmic function signal is illustrated by the waveform 132 in FIG. 6(c). Referring more specifically to FIGS. 6(c) and 6(d), when a logarithmic function signal is utilized and is time-distorted, as by reflection from a moving target, a selected portion of the signal as indicated in FIG. 6(c) between the lines 134 and 136 will be time-compressed to the form shown by curve 138 in FIG. 6(d). More precisely, the waveform between the lines 134 and 136 of FIG. 6(c), when time-distorted, results in the waveform indicated by the lines 140 and 142 of FIG. 6(d). The time distortion "immunity" of systems using the logarithmic function signal is illustrated by the fact that the curve 138 of FIG. 6(d) is identical in all respects to the portion of the curve 132 which lies between the dotted lines 141 and 143. In other words, when a selected portion of the logarithmic function signal is time-distorted, the resulting waveform is mathematically and geometrically identical to a different selected portion of the original undistorted waveform as transmitted. As stated heretofore, that unique signal is extremely advantageous for many applications in that it enables high sensitivity detection of signals regardless of the amount of intervening time distortion. However, in many applications, it is desirable to detect objects having velocities within a specified or preselected range of velocities and to discriminate against echo signals from objects having velocities outside that range.

To that end, the signalling apparatus and methods of the present invention utilize a signal which differs in that neither the frequency nor the relative phase varies exactly logarithmically with time. Rather, the preferred signal to be used in accordance with the present invention is characterized in that during each pulse the phase of the transmitted wave normalized to that of a reference wave varies with time in accordance with a function which includes a logarithmic major term and a linear minor term. When such a waveform is used in a system such as illustrated by FIG. 5, a time-distorted echo, correlated by multiplication with a replica of the transmitted waveform, produces a progressively changing relative phase shift between the echo and the reference waveform, with the changing relative phase shift being dependent on the coefficient of the linear term of the transmitted waveform function. That effect results in a high degree of correlation of echo signals which are within the desired range of Doppler shifts and a corresponding low degree of correlation and hence suppression of echoes having time distortions outside the desired range of time distortions.

More specifically, the preferred waveform used in accordance with the present invention is definable by the function:

$$f(t) = \cos[k \ln(t+s) - at] \text{ for } 0 < t < T \quad (1)$$

It will be noted that this function is the same as Equation 1 set forth in column 6. It is here restated for convenience in the following consideration of its significance. The unique character of the waveform utilized in the present invention which produces the advantageous results set forth above is attributable to the linear term "$at$" in the phase angle of the signal defined by the above function (Equation 1). This additional phase term proportionate to time introduces the following effects. The basic effect is that high correlation or effective pulse compression is still achieved for zero velocity target objects and for all velocities close to zero. At the same time, the waveform gives low correlation for other values of velocity $v$, and hence the system suppresses targets having high velocities. The range of values of $v$ that achieve high correlation is controlled by the choice of $a$. Calling $$\sigma \equiv \frac{2v}{c+v} \sim \frac{2v}{c}$$

expressions for the limiting value of $\sigma$ that is accepted by a waveform having a particular value of $a$ are:

$$|\sigma_{ADT}| = \frac{\pi p^2}{2Ta}\left[\frac{\omega_I + \omega_F}{2(\omega_I - \omega_F)}\right] + \frac{\pi p^2}{2T(\omega_I - \omega_F)} \quad (2)$$

$$= \frac{\pi p^2}{2T(\omega_I - \omega_F)}\left[\frac{\omega_I + \omega_F}{2a} + 1\right]$$

$$= \frac{p^2}{4BT}\left[\frac{\omega_I + \omega_F}{2a} + 1\right] \quad (3)$$

wherein:

$v$ is the velocity of the target object from which the echo signal in question has been reflected;

$c$ is the velocity of light ($2.99 \times 10^8$ meters/sec.);

$\sigma$ is the Doppler shift of the echo signal as given by $$\frac{2v}{c+v} \simeq \frac{2v}{c}$$

$\sigma_{ADT}$ is the adjustable Doppler tolerance limiting value of Doppler shift which will be accepted by a waveform having a given value of $a$;

$\omega_I$ is the initial angular frequency of the signal in radians per second as given by $k/s - a$;

$\omega_F$ is the final angular frequency of the signal in radians per second as given by $$\frac{k}{s+T} - a$$

B is the nominal bandwidth of the signal in cycles per second as given by $$\frac{\omega_I - \omega_F}{2\pi}$$

and $p$ is the lowest normalized value $Q^{1/2}$ of the envelope of the correlation function which is considered as acceptable for detection.

Q is related to $p$ through the equation:

$$Q = \frac{4}{p^2}\left[C\left(\frac{p}{2}\right) + S\left(\frac{p}{2}\right)^2\right]$$

where $C(x)$ and $S(x)$ are the Fresnel integrals:

$$C(x) = \int_0^x \cos\frac{\pi}{2}t^2 dt, \quad S(x) = \int_0^x \sin\frac{\pi}{2}t^2 dt$$

Thus, the limiting value of $\sigma$, $\sigma_{ADT}$ depends, of course, on the convention that is adopted for the least acceptable value of Q. For values of $|\sigma|$ less than $\sigma_{ADT}$, Q is higher, and is 1 for $\sigma = 0$.

The above formula refers to the case in which, as $a$ is changed, the parameters $k$ and $s$ are also altered in order to make the initial and final frequencies $\omega_I$ and $\omega_F$ constants. Note that $$\omega_I = \frac{k_0}{s_0}$$

and $$\omega_F = \frac{k_0}{s_0 + T}$$

where $k_0$ and $s_0$ refer to the limiting case in which $a = 0$. From the formulae, we see that as $a \to \infty$, $\sigma_{ADT}$ approaches $$\frac{\pi p^2}{2T(\omega_I - \omega_F)} \equiv \sigma_P$$

i.e., there is no value of $a$ that will enable $\sigma_{ADT}$ to be smaller than $\sigma_P$. The case $a \to \infty$ is equivalent to the linear frequency modulation case.

The present invention also includes another way of using the adjustable parameter $a$. This is to have fixed values of $k$ and $s$, such as $k_0$ and $s_0$ introduced above. Then the initial angular frequency of the waveform is $$\frac{k_0}{s_0}a$$

which *changes* as $a$ changes; it is no longer $\omega_I$; similarly for the final frequency. The bandwidth is still fixed, however. Under these conditions, the limiting value of $\sigma$, which we now call $\sigma_{ADT_I}$, is given by only the first term of Equation 2, i.e., $$\sigma_{ADT_I}\bigg| = \frac{p^2}{4BT}\left[\frac{\omega_I + \omega_F}{2a}\right]$$

so that, in this case, there is no limitation on the limiting value of $\sigma$ that may be achieved as $a$ increases.

So far, the above mathematical analysis has been confined to the case of achieving a variable Doppler acceptance band centered at zero Doppler shift ($\sigma = 0$). For some purposes, however, it may be desirable to center the acceptance band at a value of $\sigma$ other than zero. To achieve these results, it is only necessary, effectively, for the transmitted and reference waves to have different values of $a$. If the phase of the transmitted wave is represented, as before, by $k \ln(t+s) - at$, the resulting reference wave is represented effectively by $k \ln(t+s) - a_R t$, where $a$ and $a_R$ are preferably different to achieve the results mentioned. If the analysis be carried through, it is then found that all preceding results hold, with $\sigma_1$ replacing $\sigma$ where $$\sigma_1 = \frac{a_R}{a} - \beta$$

(Note $\sigma$ is $1 - \beta$.) Thus, the new region of acceptance is centered about $\sigma_1 = 0$ rather than $\sigma = 0$, which means that the region of acceptance in $\sigma$ ranges from $$1 - \frac{a_R}{a} \pm \sigma_{ADT}$$

By the approximate choice $a_R$ relative to $a$, one can make the center of the acceptance region anything one desires, while $\sigma_{ADT}$ is adjusted by means of the parameters in Equation 2 or 3. The effect of using an $a_R$ different from $a$ can also be achieved, in practice, by correlating the return wave with a time-expanded or compressed version of the transmitted wave.

By using several values of $a_R$ relative to $a$, one can, if desired, cover a relatively large Doppler spectrum and perform a "Doppler search." By adjusting $a$, one can make the acceptance band as large or small as desired, subject to the above-mentioned restriction.

In addition to the rapid fall-off of the peak value $Q^{1/2}$ of the correlation envelope as $\sigma$ changes from the design center, the *width* of the correlation *function* as a function of a time delay parameter increases rapidly as $\sigma$ moves away from the design center. Thus, not only do the design range values of $\sigma$ result in larger peak correlation, but they also yield narrow correlation functions in time. This affords an additional means of distinguishing between time distortions in the design range and those outside of the range.

While there have been described what are at present considered to be preferred embodiments of the invention, it will be obvious to those skilled in the art that various changes and modifications may be made therein without departing from the invention, and it is aimed in the appended claims to cover all such changes and modifications as fall within the true spirit and scope of the invention.

The embodiments of the invention in which an exclusive property or privilege is claimed are defined as follows:

1. An echo ranging system comprising
    means for generating and transmitting pulses of frequency modulated carrier wave energy, which pulses are characterized in that the instantaneous phase of the frequency modulated wave varies both logarithmically and nonlogarithmically with time as compared to the instantaneous phase of a constant frequency reference wave,
    means for receiving moving-object-returned echo pulses, and
    correlation means, responsive to said echo pulses and operative to compare the same with a time delayed, substantial replica of at least one transmitted pulse, for producing output signals only when the velocity of the object returning said echo pulses is within a preselected range of velocities.

2. In an echo ranging system for detection of objects having velocities within an arbitrary preselected range of velocities,
    transmitter means for transmitting pulses of oscillatory wave energy, which pulses are characterized in that during each pulse the instantaneous phase of the transmitted wave normalized to that of a reference wave varies both logarithmically and nonlogarithmically as a function of time,
    receiver means for receiving object-returned echo pulses, and
    correlation means responsive to said echo pulses for comparing the same with a time delayed facsimile of a transmitted pulse in a manner such that output signals are produced only in response to echoes from objects having velocities within said range of velocities.

3. An echo ranging system in accordance with claim 2, in which the normalized phase of the transmitted wave varies with time in accordance with a function which includes a logarithmic major term and a linear minor term.

4. An echo ranging system in accordance with claim 2, in which the normalized phase of the transmitted wave varies with time in accordance with a function which includes a logarithmic major term and a linear minor term so that when a time distorted echo is correlated by multiplication with a replica of the transmitted wave there is a progressively changing relative phase shift between said echo and said wave, with the changing relative phase shift being dependent upon the coefficient of said linear term.

5. In an echo ranging system for detection of objects having velocities within a preselected range of velocities, transmitter means for transmitting pulses of oscillatory wave energy, which pulses are characterized in that during each pulse the transmitted wave amplitude varies as the function of time $$f(t) = \cos[k \log (t+s) - at]$$

wherein
- $t$ is the elapsed time from the beginning of the pulse,
- $k$ is a constant,
- $s$ is a fixed time constant, and
- $a$ is a finite constant determinative of the rate at which the time variation of phase departs from a pure logarithmic function, receiver means for receiving object-returned echo pulses, and correlation means responsive to said echo pulses for comparing the same with a time delayed facsimile of a transmitted pulse in a manner such that output signals are produced only in response to echoes from objects having velocities within said range of velocities.

References Cited by the Examiner

UNITED STATES PATENTS

| | | | |
|---|---|---|---|
| 2,688,124 | 8/54 | Doty et al. | 343—100.7 |
| 3,024,458 | 3/62 | Cohen et al. | 343—17.1 |
| 3,157,874 | 11/64 | Alter et al. | 343—5 |

CHESTER L. JUSTUS, *Primary Examiner.*